(12) United States Patent
Van Koningsveld

(10) Patent No.: US 7,061,490 B2
(45) Date of Patent: Jun. 13, 2006

(54) MULTI-VARIATE DATA AND RELATED PRESENTATION AND ANALYSIS

(75) Inventor: Richard A. Van Koningsveld, Mazomainie, WI (US)

(73) Assignee: PolynaryThink, LLC, Seattle, WA (US)

( * ) Notice: Subject to any disclaimer, the term of this patent is extended or adjusted under 35 U.S.C. 154(b) by 610 days.

(21) Appl. No.: 10/036,811

(22) Filed: Dec. 31, 2001

(65) Prior Publication Data

US 2003/0122827 A1 Jul. 3, 2003

(51) Int. Cl.
*G06T 11/20* (2006.01)

(52) U.S. Cl. ............... 345/440; 345/440.1; 345/440.2; 345/442; 345/441; 345/443

(58) Field of Classification Search ........ 345/440–441, 345/442, 443; 707/100, 500, 3; 706/45, 706/55; 704/9
See application file for complete search history.

(56) References Cited

U.S. PATENT DOCUMENTS

| | | |
|---|---|---|
| 5,179,643 A | 1/1993 | Homma et al. |
| 5,348,020 A | 9/1994 | Hutson |
| 5,404,880 A | 4/1995 | Throne |
| 5,794,178 A * | 8/1998 | Caid et al. ............... 704/9 |
| 6,058,248 A | 5/2000 | Atkins et al. |
| RE36,840 E * | 8/2000 | Mihalisin et al. ........ 345/440.2 |
| 6,122,634 A | 9/2000 | Brodsky |
| 6,151,595 A | 11/2000 | Pirolli et al. |
| 6,259,451 B1 * | 7/2001 | Tesler ................... 345/419 |
| 6,278,464 B1 * | 8/2001 | Kohavi et al. ........... 345/440 |
| 6,476,814 B1 * | 11/2002 | Garvey ................... 345/440 |
| 6,523,026 B1 * | 2/2003 | Gillis ..................... 707/3 |
| 6,564,197 B1 * | 5/2003 | Sahami et al. ............ 706/55 |
| 6,611,825 B1 * | 8/2003 | Billheimer et al. .......... 706/45 |

* cited by examiner

Primary Examiner—Matthew C. Bella
Assistant Examiner—Mike Rahmjoo
(74) Attorney, Agent, or Firm—Schwabe, Williamson & Wyatt, P.C/

(57) ABSTRACT

A recursively partitioned/nested geometric structure is employed to graphically present and/or facilitate analysis of multi-variate data, including functions of multi-dimensional variables. Visual attributes are associated with appropriate ones of the regions within the geometric structure, in accordance with determined graphing values. In one embodiment, the data are normalized, comprising relative coordinate values, and encoded into polynary strings. Processing is advantageously performed using the polynary strings.

61 Claims, 13 Drawing Sheets

MULTI-VARIATE DATA AND RELATED PRESENTATION AND ANALYSIS

BACKGROUND OF THE INVENTION

1. Field of the Invention

The present invention relates to the field of data processing. More specifically, the present invention relates to data processing techniques associated with multi-variate data and related presentation and analysis.

2. Background Information

Many problems and/or applications involve the processing and presentation of multi-variate data and/or multi-dimensional functions, especially in the areas of academic research and other applied domains where mathematical equations/quantitative data are used in presentations or decision making. Examples of such academic research and other applied domains include but are not limited to the disciplines of sociology, psychology, geology, physics, meteorology, biology, marketing, and other complex scientific disciplines.

A number of multi-variate presentation and analysis techniques are known in the art. However, all of these prior art techniques suffer from at least the disadvantage of not being able to effectively convey the essence and/or relations of high dimensional data, in particular, not being able to ordinate the essence and/or relations of quantitative information of more than three dimensions in a spatially and/or cognitively coherent way.

Thus, an improved presentation and/or analysis technique for handling and/or dealing with multi-variate data and/or multi-dimensional function is desired.

SUMMARY OF THE INVENTION

A recursively partitioned/nested geometric structure is employed to graphically present and/or facilitate analysis of multi-variate data, including multi-dimensional functions. Visual attributes are associated with appropriate ones of the regions within the geometric structure, in accordance with determined graphing values for the regions.

In one embodiment, the data are normalized, comprising relative coordinate values, and encoded into polynary strings. Processing is advantageously performed using the polynary strings.

In one embodiment, a graphing function and a data format converter are incorporated with the teachings of the present invention to practice the present invention.

In one embodiment, a processor based apparatus is equipped with the graphing function and the data format converter.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

The present invention, as summarized earlier, includes data processing presentation and analysis techniques for multi-variate data and/or multi-dimensional function. In the description to follow, various aspects of the present invention will be described, specific operational flows and configurations will be set forth. However, the present invention may be practiced without some of these specific details. In other instances, well-known features are omitted or simplified in order not to obscure the present invention.

The description will be presented in terms of operations performed by a processor based device, using terms such as data, functions, format conversions, determining, associating, and so forth, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical, electrical and/or optical components of the processor based device. Moreover, the term processor includes microprocessors, micro-controllers, digital signal processors, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The description repeatedly uses the phrase "in one embodiment", which ordinarily does not refer to the same embodiment, although it may. The terms "comprising", "including", "having", and the like, as used in the present application, are synonymous.

Overview

Figure 1:
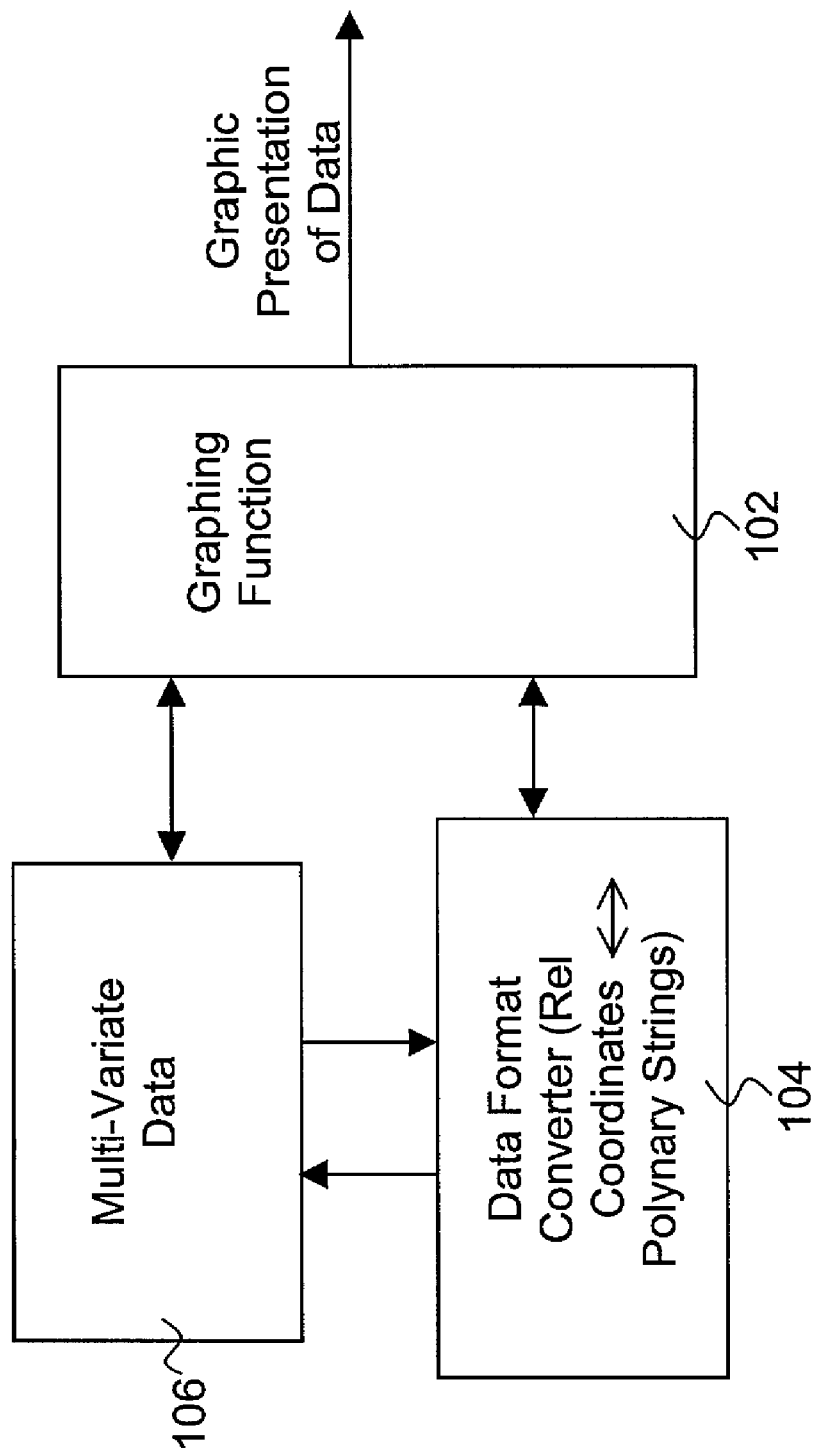
FIG. 1 illustrates an overview of the present invention, in accordance with one embodiment.
Figure 2D:
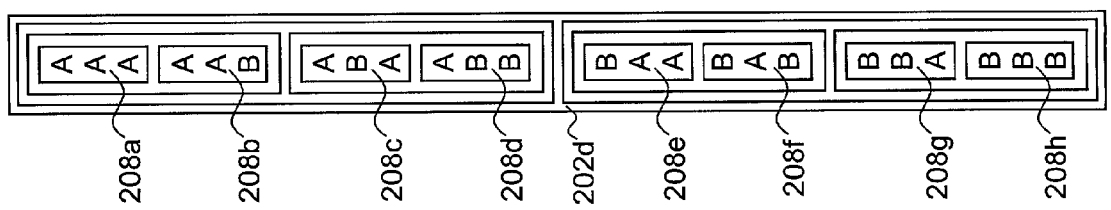
FIGS. 2a–2d illustrate the sequential organization schematic of one example recursively partitioned/nested geometric structure based on a line segment that may be used by the graphic function of FIG. 1 to practice the present invention.
Figure 2C:
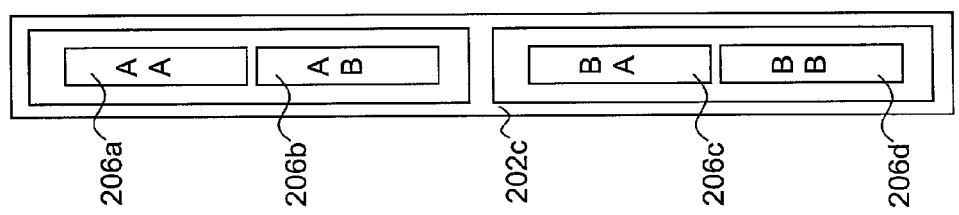
Figure 2B:
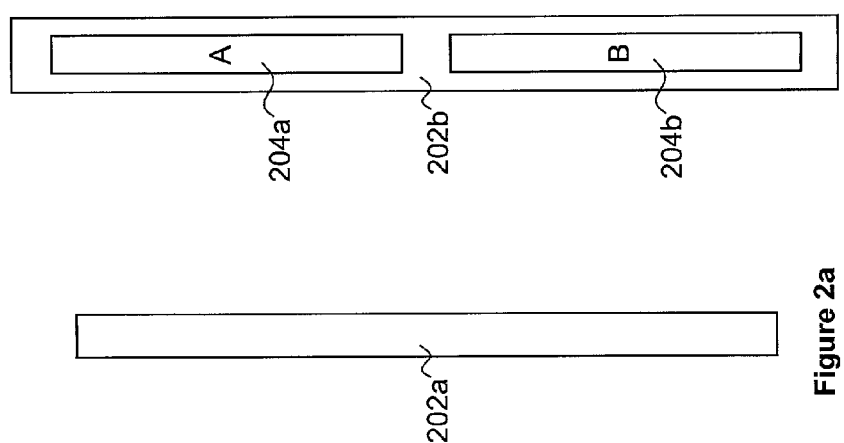
Figure 2A:
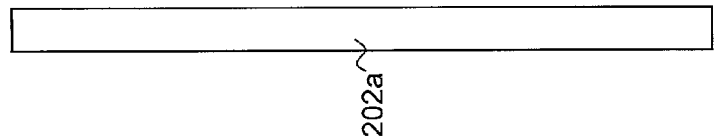

Referring now to FIG. 1, wherein a block diagram illustrating an overview of the present invention, in accordance with one embodiment, is shown. As illustrated, for the embodiment, graphing function 102 and data format converter 104, incorporated with the teachings of the present invention are provided to facilitate presentation and analysis of multi-variate data 106 of a multi-dimensional data space or multi-dimensional functions (not shown). More specifically, graphing function 102 is equipped to advantageously present multi-variate data 106 and/or multi-dimensional functions employing recursively partitioned and/or nested geometric structures, which as will be apparent from the description to follow, rendering high-dimensional data more comprehensible. Further, for the embodiment, graphing function 102 advantageously processes the multi-variate data or variable values of a multi-dimensional function encoded in the polynary string form of the present invention, enabling the processing, presentation, and facilitation of analysis to be accomplished more efficiently. For the embodiment, data format converter 104 is provided to assist graphing function 102 in converting multi-variate data 106 and variable values of a multi-dimensional function between a relative coordinate form, and the polynary string form of the present invention.

Multi-variate data 106 and the multi-dimensional functions represent a broad range of such data and functions. Examples include but are not limited to data and functions commonly encountered in problems and/or studies in the disciplines of sociology, geology, physics, biology, and other complex scientific disciplines of the like.

Further, the present invention contemplates that graphing function 102 and data format converter 104 may be jointly realized in a standalone product or part of a larger product, or separately realized as two standalone products or part of two respective larger products, or combinations there of.

Recursively Partitioned/Nested Geometric Structure

FIGS. 2a–2d illustrate the sequential organization schematic of an example recursively partitioned and/or nested geometric structure may be used by graphic function 102 to present and facilitate analysis of "two part" multi-variate data 106 and/or "two dimension" functions. As illustrated, geometric structure 202d is formed by recursively partitioning geometric structure 202a, a "line" segment. For the example, line segment geometric structure 202a is first partitioned into two portions, top portion 204a and bottom portion 204b, to form geometric structure 202b. Then, the two portions 204a and 204b of geometric structure 204b are respectively partitioned in like manner into, portions 206a, 206b, 206c and 206d, to form geometric structure 202c. The four portions 206a–206d in turn are respectively partitioned in like manner into portions 208a–208h to form geometric structure 202d.

As those skilled in the art would appreciate, geometric structure 202d may also be described as being formed by recursively nesting geometric structure 202a into the successively formed geometric structures 202b and 202c. For example, geometric structure 202a is first nested into a top and a bottom portion of itself to form geometric structure 202b. Then, geometric structure 202a is again nested into a top and a bottom portion of each of the two previously inserted or nested portions to form geometric structure 202c. Likewise, geometric structure 202a is again nested into a top and a bottom portion of each of the four previously inserted or nested portions to form geometric structure 202d.

The recursive partition and nesting process, in theory, may continue indefinitely. However, as those skilled in the art would appreciate, at certain level, depending on the granularity of the display device (such as, the amount of pixels available), the usefulness of the additional details of the recursively partitioned/nested geometric structure may be limited.

As labeled, the successively formed portions may also be referred to as regions A and B 204a and 204b, regions AA, AB, BA and BB 206a–206d, and regions AAA, AAB, ABA, ABB, BAA, BAB, BBA, and BBB 208a–208h, or considered as regions corresponding to these labels. As will be readily apparent from the description to follow, the inherent ability to reference regions of such a recursively partitioned/nested geometric structure, allows employment of the polynary strings of the present invention to efficiently and effectively accomplish the desired presentation and analysis.

Figure 3B:
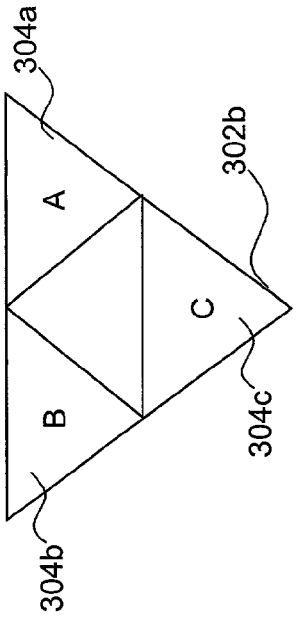
FIGS. 3a–3c illustrate the sequential organization schematic of another example recursively partitioned/nested geometric structure based on a triangle that may be used by the graphic function of FIG. 1 to practice the present invention.
Figure 3A:
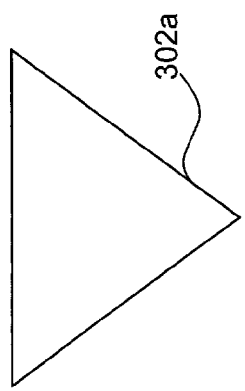
Figure 3C:
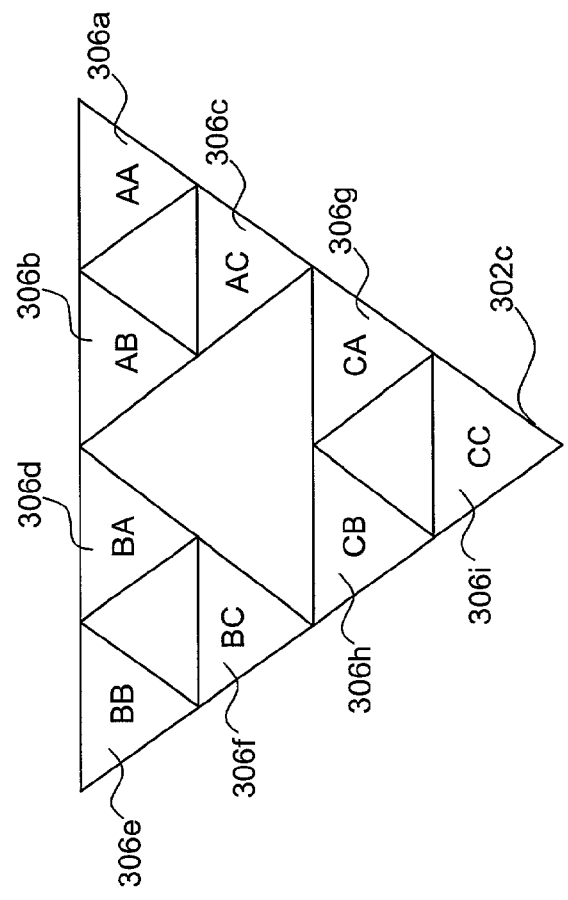
Figure 3D:
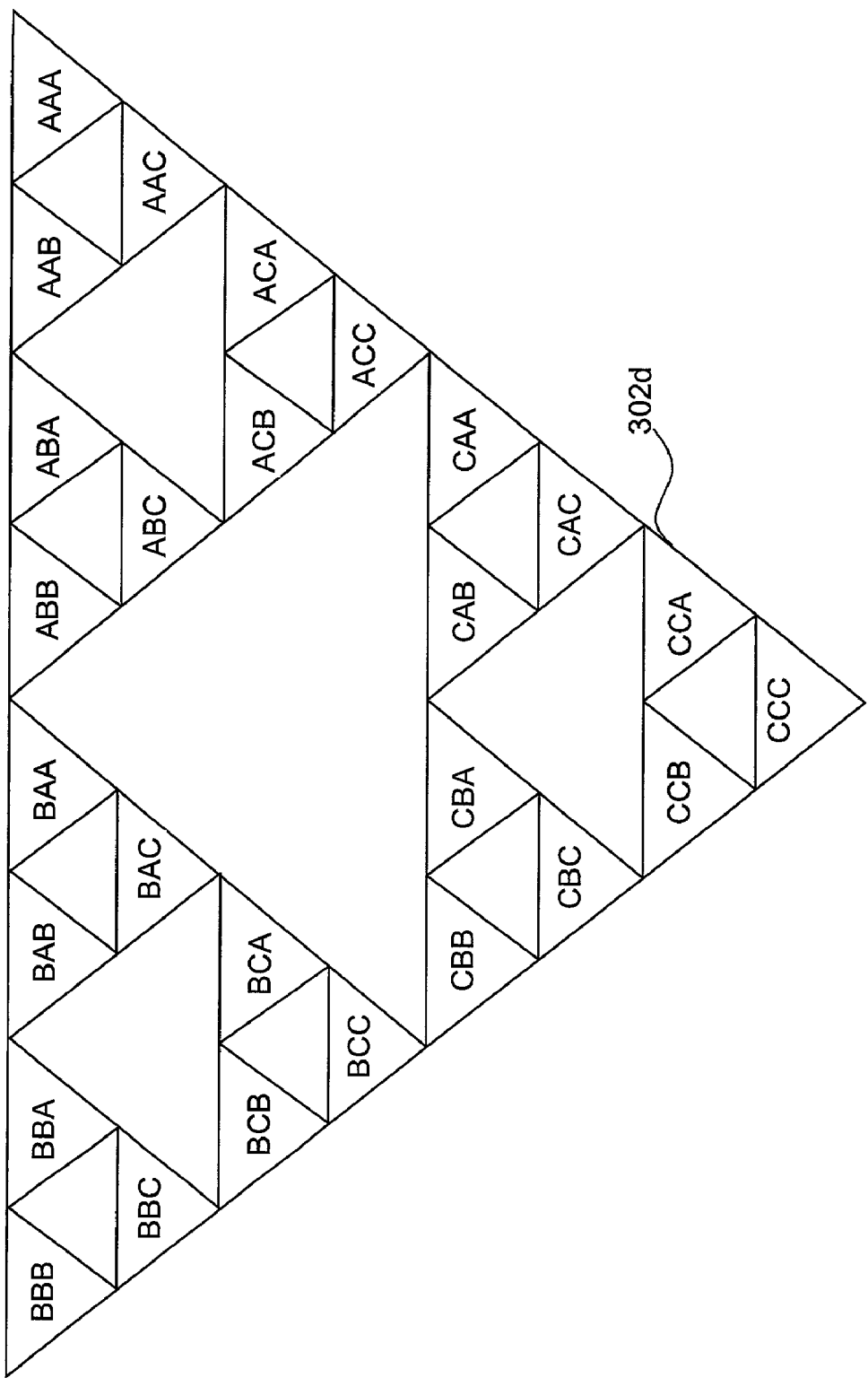

FIGS. 3a–3c illustrate the sequential organization schematic of another example recursively partitioned and/or nested geometric structure may be used by graphic function 102 to present and facilitate analysis of "three part" multi-variate data 106 and/or "three dimension" functions. As illustrated, geometric structure 302d is formed by recursively partitioning geometric structure 302a, a triangle. For the example, triangle or geometric structure 302a is first partitioned into three portions, top-right portion 304a, top-left portion 304b, and bottom portion 304c, to form geometric structure 302b. Then, the three portions 304a–304c of geometric structure 304b are respectively partitioned in like manner into, at least three portions each, portions 306a–306j, to form geometric structure 302c. The nine portions 306a–306j in turn are respectively partitioned in like manner to form geometric structure 302d.

Again, as described earlier, geometric structure 302d may be considered as being formed by recursively nesting geometric structure 302a into the respective portions of the successively formed geometric structures 302b and 302c.

The recursive partition and/or nesting process of FIG. 3 too may in theory be continued indefinitely. Similarly, depending on the granularity of the display device, the usefulness of the additional details of the geometric structure may be limited.

Further, as labeled, the successively formed portions may be referred to as regions A, B and C 304a–304c, regions AA, AB, AC, BA, BB, BC, CA, CB and CC 306a–306j, and regions AAA, AAB, AAC, ABA, ABB, ABC, ACA, ACB, ACC, BAA, BAB, BAC, BBA, BBB, BBC, BCA, BCB, BCC, CAA, CAB, CAC, CBA, CBB, CBC, CCA, CCB and CCC, or considered as regions corresponding to these labels.

Figure 4B:
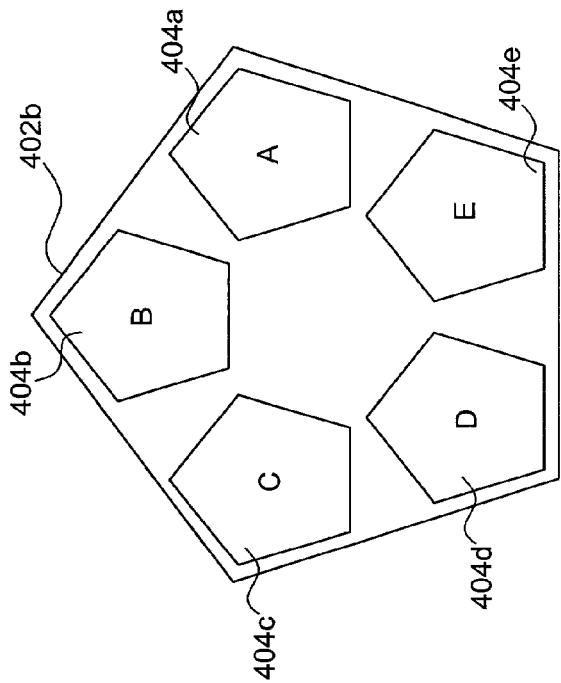
FIGS. 4a–4b illustrate the sequential organization schematic of yet another example recursively partitioned/nested geometric structure based on a pentagon that may be used by the graphic function of FIG. 1 to practice the present invention.
Figure 4C:
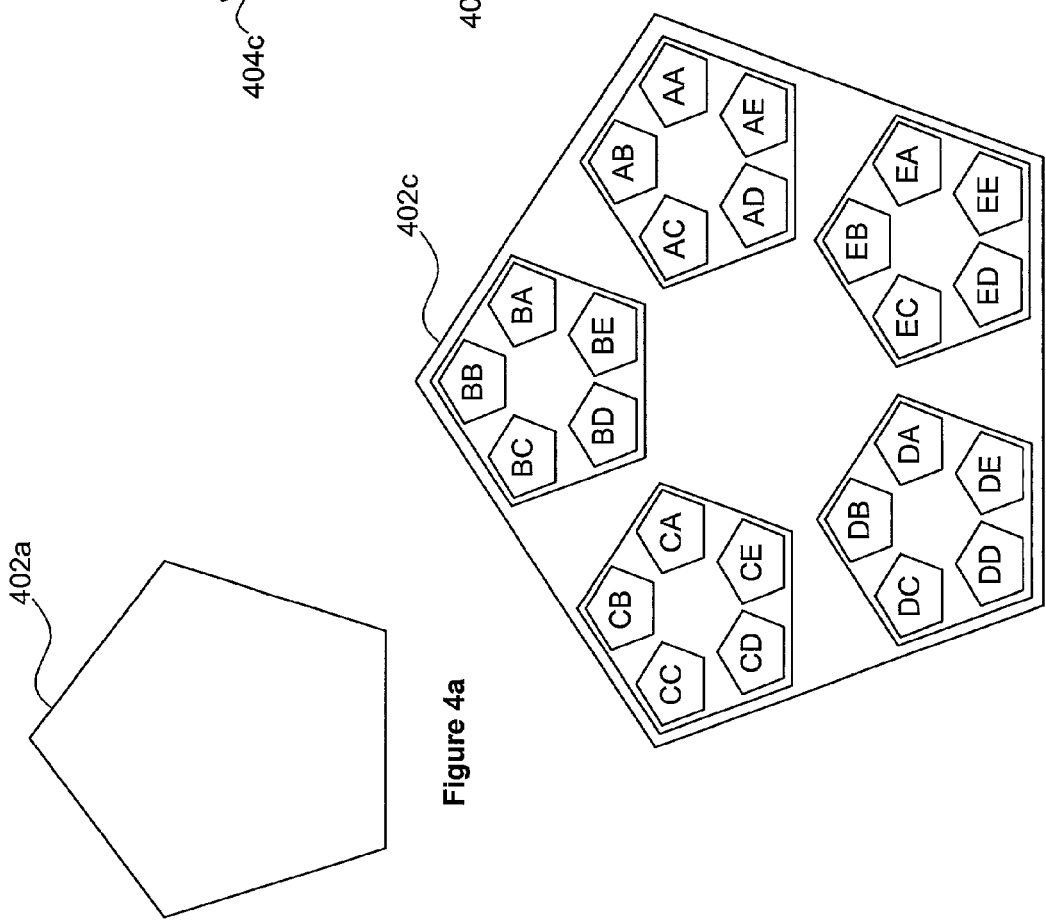
Figure 4A:
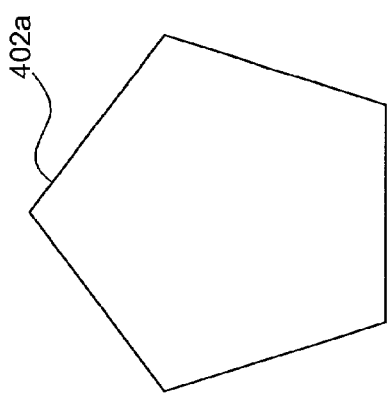

FIGS. 4a–4c illustrate the sequential organization schematic of another example recursively partitioned and/or nested geometric structure may be used by graphic function 102 to present and facilitate analysis of "five part" multi-variate data 106, and/or "five dimension" functions. As illustrated, geometric structure 402c is formed by recursively partitioning geometric structure 402a, a pentagon. For the example, pentagon or geometric structure 402a is first partitioned into at least five portions, in a clockwise direction, portions 404a, 404b, 404c, 404d and 404e, to form geometric structure 402b. Then, the five portions 404a–404e of geometric structure 402b are respectively partitioned in like manner into at least five portions each, to form geometric structure 402c.

Again, as described earlier, geometric structure 402c may be considered as being formed by recursively nesting geometric structure 402a into the respective portions of the successively formed geometric structures, such as geometric structure 402b.

As the earlier examples, the recursive partition and nesting process may also be continued indefinitely.

As labeled, the successively formed portions may also be referred to as regions A, B, C, D and E 404a–404e, regions AA, AB, AC, AD, AE, BA, BB, BC, BD, BE, CA, CB, CC, CD, CE, DA, DB, DC, DD, DE, EA, EB, EC, ED and EE, or considered as regions corresponding to these labels.

Figure 5:
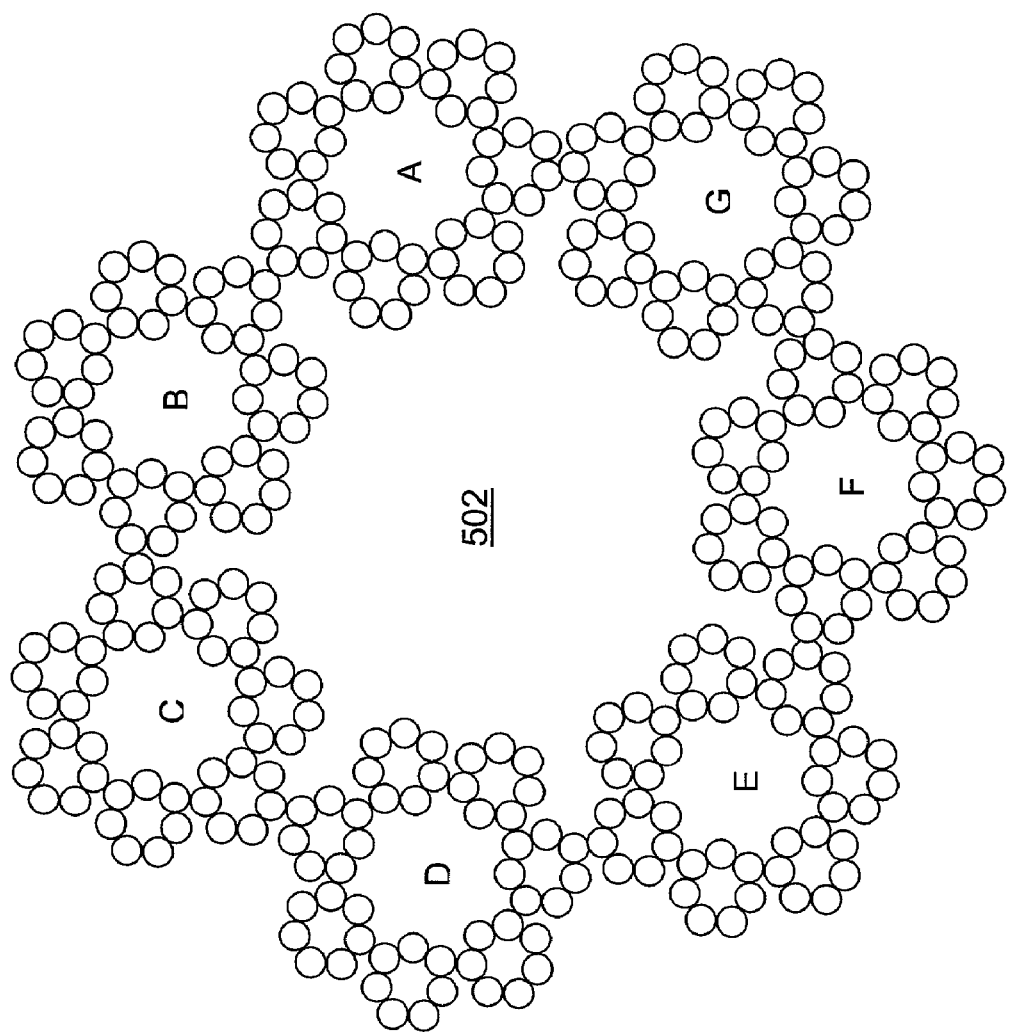
FIG. 5 illustrates an example recursively partitioned/nested geometric structure based on different geometric primitives (a heptagon and a circle) that may be used by the graphic function of FIG. 1 to practice the present invention.

FIG. 5 illustrates yet another example of a recursively partitioned/nested geometric structure may be used by graphing function 102 for presentation and analysis of "seven part" multi-variate data 106, and/or "seven-dimension" functions. The example geometric structure may be formed by recursively partitioning a heptagon geometric structure, as described earlier for the earlier examples, with the modification that the resulting regions are denoted using a different geometric primitive, i.e. the circle.

Thus, it can be seen from these descriptions, the geometric structures formed in the above described recursively partition or nesting process remain fully scalable, applicable to very high dimensional data. In other words, Recursively partitioned geometric structures suitable for use to practice the present invention need not always be formable in a parallel recursive nesting process employing the same geometric primitive as in the earlier described example cases.

Figure 6:
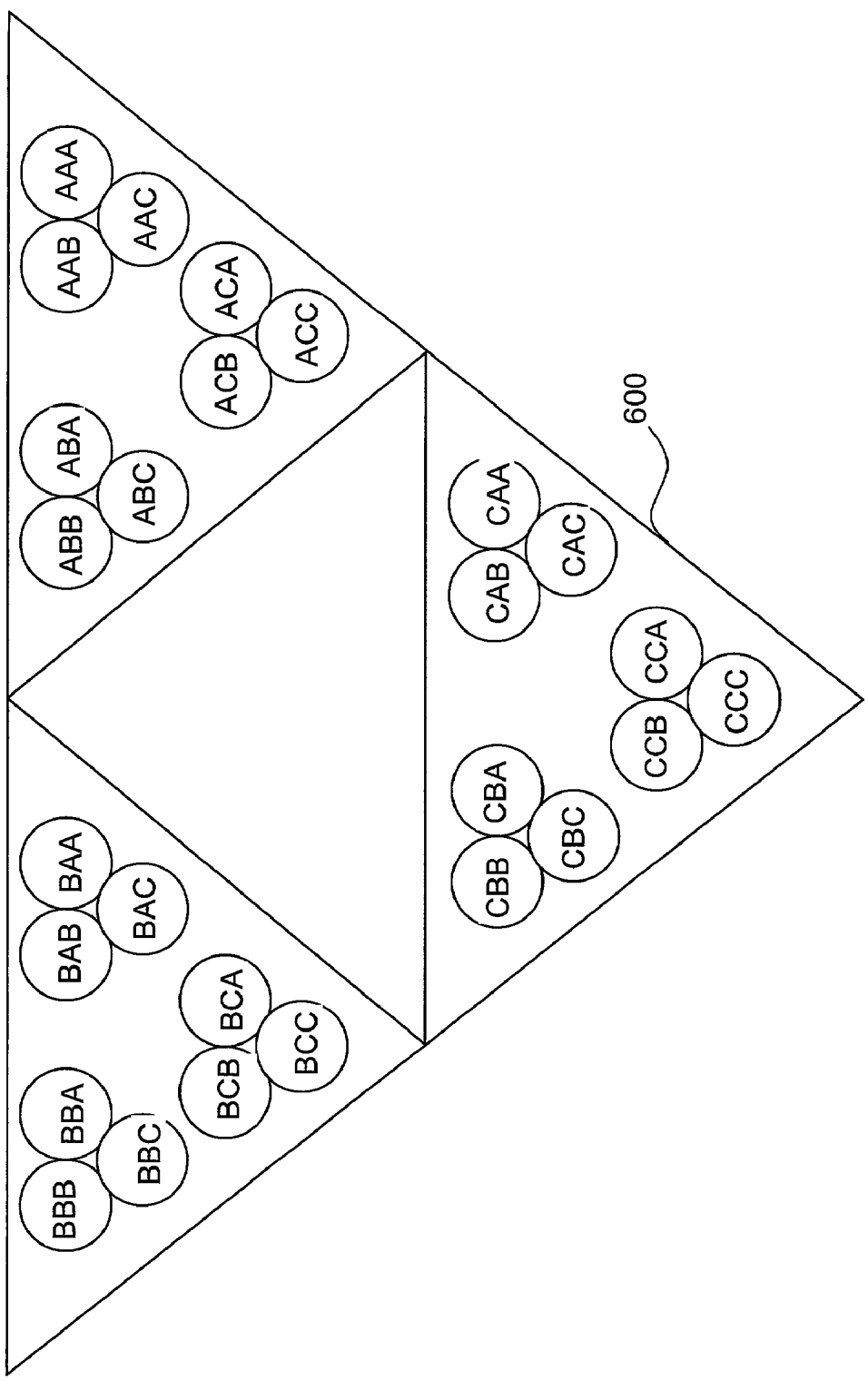
FIG. 6 illustrates another example recursively partitioned/nested geometric structure based on different geometric primitives (a triangle and a circle) that may be used by the graphic function of FIG. 1 to practice the present invention.

FIG. 6 illustrates another one of such example recursively partitioned/nested geometric structure employing different geometric primitives. Geometric structure 600 may be formed by first partitioning a triangle geometric structure into three parts. The three parts in turn are recursively partitioned in like manner, creating the regions shown, but depicting the resulting regions using a different geometry primitive, e.g. a circle, to form the final geometric structure 600. Again, the process may continue to form other further partitioned geometric structures. However, it is readily apparent that the resultant geometric structure, such as geometric structure 600 is not formed by recursively nesting the same geometric structure/triangle into itself or the previously nested structures.

As will be readily apparent from the description to follow, any of these geometric structures or other geometric structures formed in a like manner, i.e. through recursively partitioning, recursive nesting, or both, employing the same or multiple geometric primitives, may be employed to practice the present invention to facilitate presentation and analysis of multi-variate data 106 and/or multi-dimensional functions. Geometric structures formed in the described manner are scalable to even the very high dimensional data and/functions encountered in many complex problems and/or applications.

Relative Coordinates and Polynary Strings

As alluded to earlier, in various embodiments, to facilitate efficient operation of graphing function 102, multi-variate data 106 are advantageously normalized into relative coordinates, and encoded into polynary strings of the present invention. A normalized data comprising relative coordinates is a data vector having multiple non-negative parts that numerically sum to the value of "1". A polynary string comprises a sequence of symbols. The length of the sequence (K) is determined by the precision desired. For example, a particular mixed fruit salad having 51% apples, 17% bananas, and 32% cherries comprises the relative coordinates of {0.51, 0.17 and 0.32}, and as will be shown later, may be represented by the polynary string of ACABCB, having a sequence length of 6, i.e. 6 occurrences of the symbol A, B or C, where the symbols A, B and C correspond to the fruit Apple, Banana and Cherry respectively.

Figure 7:
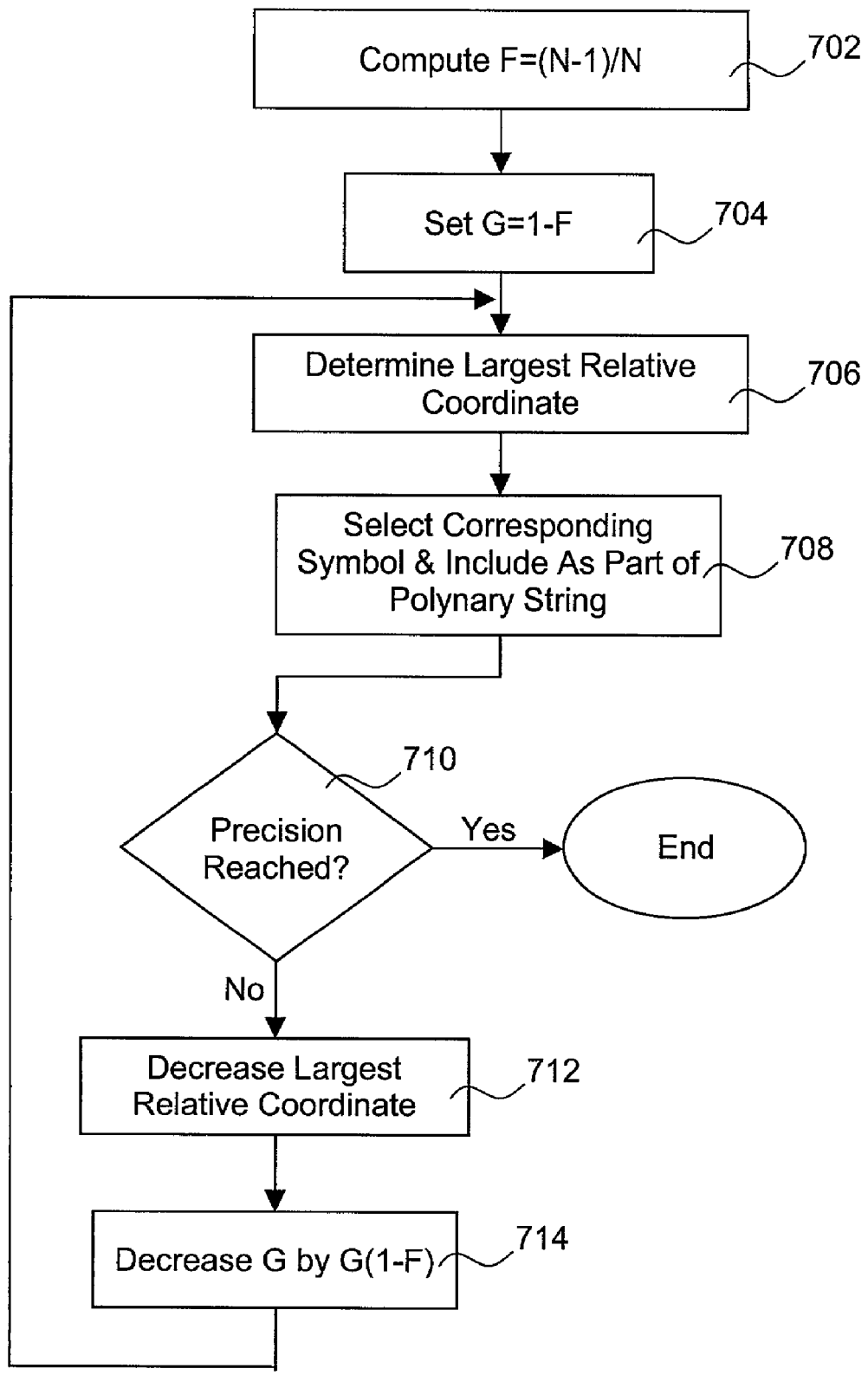
FIG. 7 illustrates the operational flow of the relevant aspects of the data format converter of FIG. 1 for generating a polynary string encoding a set of relative coordinates, in accordance with one embodiment.

FIG. 7 illustrates the operation flow of the relevant parts of data format converter 104 for generating a polynary string to represent a normalized multi-variate data comprising a plurality of relative coordinates, in accordance with one embodiment. For each normalized multi-variate data comprising a plurality of relative coordinates, for the embodiment, data format converter 104 first computes a working constant (F) by dividing (N−1) by N, where N equals the number of relative coordinates, block 702. Next, data format converter 104 computes a current version of a working variable (G) by subtracting the constant F from 1, block 704.

For example, for the example fruit salad mentioned earlier, N equals 3, therefore F equals ⅔ or 0.6667. Further, G initially equals ⅓ or 0.3333.

Then, data format converter 104 determines which of the relative coordinates has the largest coordinate values, block 706. Upon so determining, data format converter 104 selects the symbol corresponding to the current relative coordinate having the largest relative coordinate value, and includes the selected symbol as part of the polynary string, block 708. For the embodiment, the selected symbol is appended to the polynary string (initially, a null string).

Again, using the earlier mentioned fruit salad as an example, for the first iteration, the relative coordinate of Apple would be determined as being the highest relative coordinate value (0.51), accordingly, the corresponding symbol A would be selected as the first symbol of the polynary string.

Next, data format converter 104 determines if the desired level of precision, i.e. the desired length of the sequence (K), has been reached, block 710. If the desired level of precision/length has not been reached, data format converter 104 decrements the largest relative coordinate in a predetermined manner, for the embodiment, by the current value of the working variable G, block 712. In like manner, data format converter 104 also decrements the working variable G in a predetermined manner, for the embodiment, by the value of G*(1−F), block 714. In other words, G is newly set to G*F (as G−G*(1−F) equals G*F). Thereafter, the process returns to block 706 and continues from there as earlier described.

Referring again to the earlier described example salad, thus upon selection of the symbol A as the first symbol of the polynary string, data format converter 104 decrements the highest relative coordinate value, which is Apple, with the value of 0.51, by the initial value of G (i.e. G(1)), which as described earlier is 0.3333. Therefore, after the decrement, the relative coordinate value of Apple is now 0.1767 (0.51− 0.3333). Further, the new current value of G, i.e. G(2), is 0.2222.

For the second iteration, the relative coordinate value of Cherry will be determined as the highest relative coordinate value 0.32 versus 0.1767 for Apple and 0.17 for Banana. Accordingly, the corresponding symbol B is selected as the next symbol for inclusion in the polynary string. Upon selection, the relative coordinate value of Cherry is decremented by G(2) to 0.0978 (0.32−0.2222), and G(2) is decremented to 0.1481 generating G(3).

Eventually, the desired level of precision/length (K) is reached (yes branch of block 710), at such time, the process terminates, and the cumulative symbols are output as the polynary string of the normalized multi-variate data comprising a plurality of relative coordinates. The desired level of precision/length may be specified for data format converter 104 in any one of a number of known techniques, e.g. as a parameter of an invocation function call.

Referring again to the fruit salad example, after six iterations, the polynary string (length=6) is ACABCB, and the residual relative coordinate values for the three fruits are 0.285, 0.273 and 0.0319 respectively. The current value of G, i.e. G(7), is 0.0293. Assuming the polynary string of 6 symbols reaches the precision level specified, the process terminates, and the sequence of symbols is returned. Note that G(K+1) (G(7) in the fruit salad example) equals to the average residual relative coordinate values.

In some applications, the initial numeric values of the relative coordinate values of two or more variables of a data vector of a set of multi-variate data may be the same. A tie breaking or precedence rule, such as left to right or right to left (with a data vector being perceived as a "horizontal" or "row" vector), or top to bottom or bottom to top (with a data vector being perceived as a "vertical" or "column" vector), may be consistently employed to supplement the earlier described process for generating a polynary string of the present invention. For example, an alloy comprising equal number of parts of iron and carbon, has the relative coordinate value of 0.5 for both iron and carbon. Thus, the alloy may be represented by a polynary string of IC or CI, where I stands for iron, and C stands for carbon. Whether IC or CI is generated depending on the tie breaking rule consistently employed. If the first and second data tuples of the "row" data vector represent the content of iron and carbon respectively, the polynary string IC will be resulted if the left to right precedent rule is employed. Alternatively, for the same data vector, the polynary string CI will be resulted if the right to left precedent rule is employed instead. The preference is application dependent. In alternate embodiments, other tie breaking or precedent rules may be employed to address the issue of equal relative contributions, as long as the rule is consistently employed.

Figure 8:
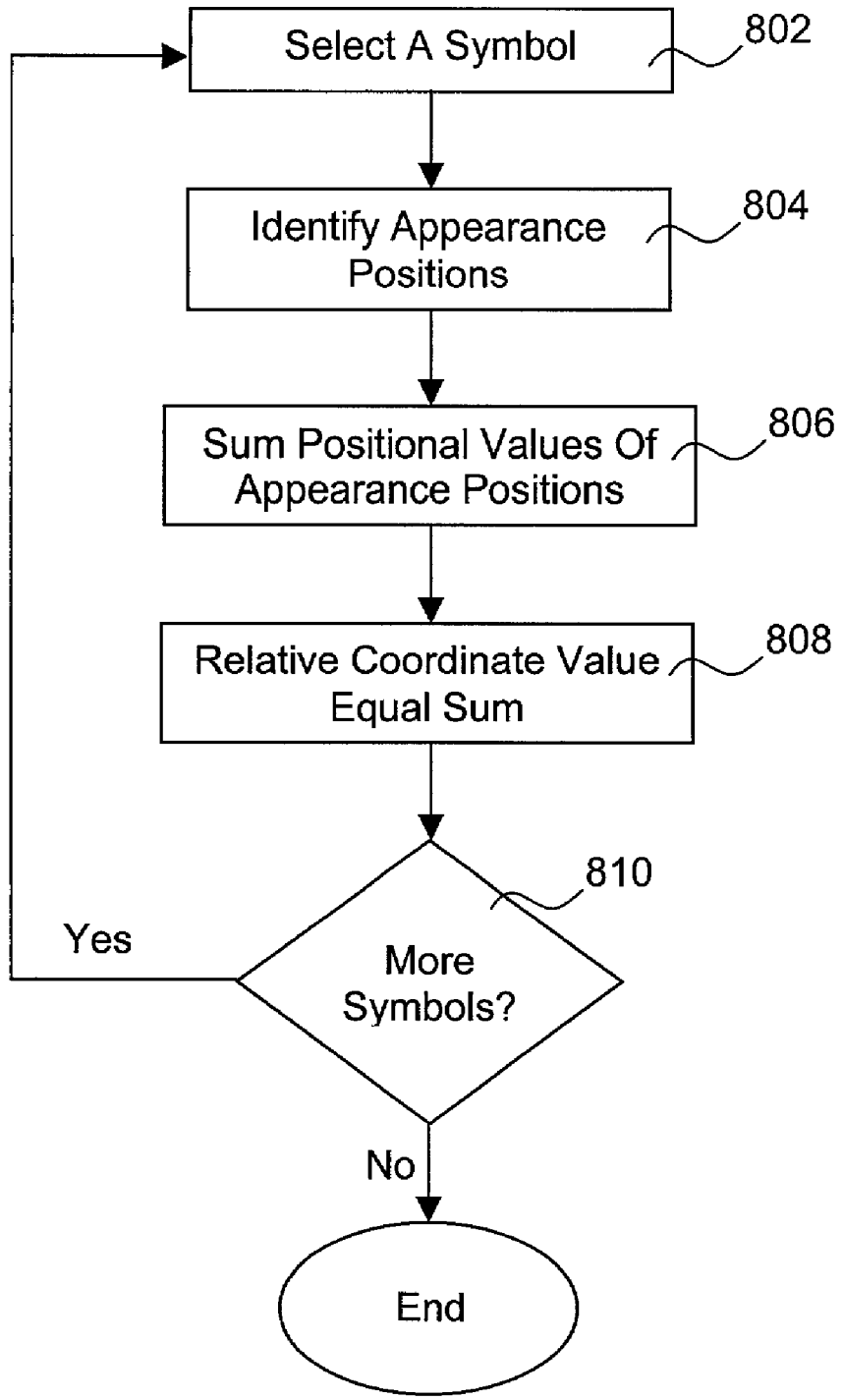
FIG. 8 illustrates the operational flow of the relevant aspects of the data format converter of FIG. 1 for generating the relative coordinates of a polynary string, in accordance with one embodiment.

As alluded to earlier, depending on the type of graphing being performed, from time to time, graphing function 102 may need to recover the relative coordinate values of the normalized multi-variate data represented by a polynary string. FIG. 8 illustrates the operational flow of the relevant parts of data format converter 104 for recovering the relative coordinates of a normalized multi-variate data represented by a polynary string. As illustrated, data format converter 104 selects one of the variables, block 802. Data format converter 104 identifies its symbol, e.g. from a data dictionary, and the positions the corresponding symbol appears in the polynary string, if any, block 804. For the embodiment, by virtue of the manner polynary strings are generated, a contribution value is attributable to each position a symbol appears in the polynary string. The contribution value equals to the then current value of the working variable G, or G(i), at the time (i) a particular symbol is selected and included as part of the polynary string. Thus, to recover the corresponding relative coordinate value for the symbol, data format converter 104 sums the positional values of the appearances of the symbol G(i)s, where i is less than K+1, and the terminal value of the working variable G, i.e. G(K+1), block 806, and outputs the sum as the recovered relative coordinate, block 808.

In one embodiment, if the corresponding symbol of the variable does not appear in the polynary string (i.e. its relative coordinate value was never the highest when compared to other relative coordinate values, for the precision/sequence length desired), the relative coordinate value of the variable is set to the average residual relative coordinate value, i.e. the terminal value of the working variable G(K+1). In alternate embodiments, other application dependent manners, more or less precise, may also be employed to address the issue of un-represented variable of a data vector.

Next, data format converter 104 determines if the corresponding relative coordinate have been recovered for all variables of the data vector represented by the polynary string (i.e. whether N variables have been processed), block 810. If not, the process returns to block 802 and continues from there, as earlier described. If yes, the process terminates.

Referring to the fruit salad example again, three variables or ingredients were encoded (N=3). The symbol A for the first variable/ingredient Apple appears in position 1 and 3 of the polynary string ACABCB, thus the relative coordinate value for Apple is recovered by adding the values of G1, G3 and G7, which are 0.3333, 0.1481 and 0.0293 respectively. The result is the original relative coordinate value for the first variable/ingredient Apple, 0.5107. The relative coordinate value for the second variable/ingredient Banana may be recovered in like manner by summing G4, G6 and G7 (B appears in positions 4 and 6), which are 0.0988, 0.0439 and 0.0293 respectively. The result is the original relative coordinate value for the second variable/ingredient Banana, 0.1720. The relative coordinate value for Cherry may also be recovered in like manner by summing G2, G5 and G7 (C appears in positions 2 and 5), which are 0.2222, 0.0658 and 0.0293 respectively. The result is the original relative coordinate value for the third variable/ingredient Cherry, 0.3173.

Graphing and Analysis

Figure 9:
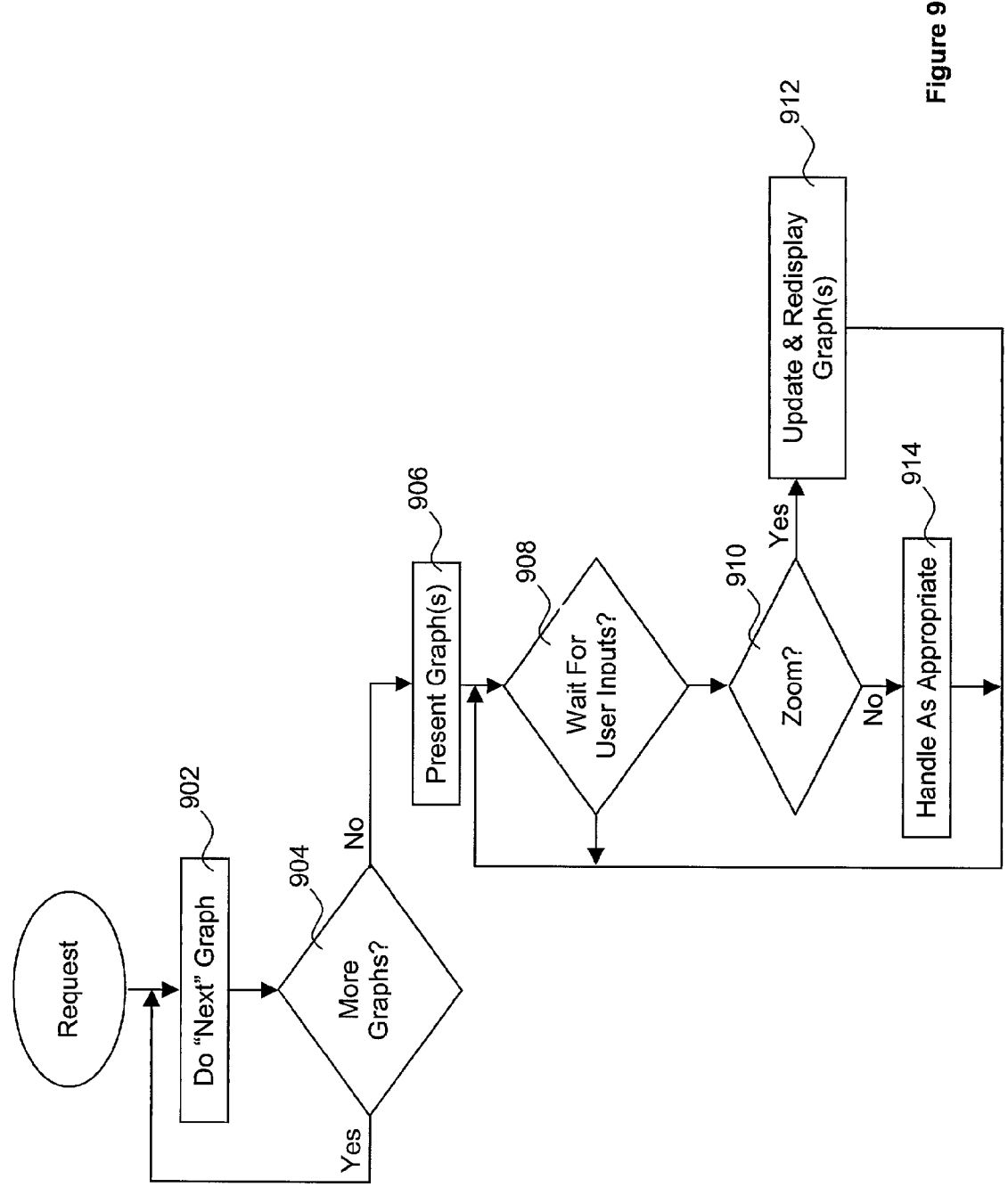
FIG. 9 illustrates the overall operational flow of the graphing function of FIG. 1, in accordance with one embodiment.

FIG. 9 illustrates the overall operational flow of graphing function 102 for presenting multi-variate data, including functions with multi-dimensional variables, and facilitating their analysis, in accordance with one embodiment. In addition to being able to present either multi-variate data or functions with multi-dimensional variables, the embodiment is also able to support presentation of multiple sets of data/functions in a side-by-side or multi-page manner, as well as facilitate "zooming" into a subset of the data/function being presented.

As illustrated, upon requested, graphing function 102 proceeds to process a first set of multi-variate data or function, generating the display data associated with a recursively partitioned/nested geometric structure with visually differentiated structural parts for use to present the data/function (to be described more fully below), block 902. In one embodiment, the generation of the display data associated with a recursively partitioned/nested geometric structure includes the generation of the center of each of the primitive elements of the geometric structure. In one embodiment, the coordinates $(x_p, y_p)$ of the center of each of the primitive elements of the geometric structure for polynary strings representing N relative coordinate values, each consisting of a sequence of K (k=1, 2, ... K) symbols, are generated as follows:

$$Xp = Xc + R * \sum_{k=1}^{K} V(N, k) * C(N, m[Lk])$$

$$Yp = Yc + R * \sum_{k=1}^{K} V(N, k) * S(N, m[Lk])$$

where:

($X_c$, $Y_c$) are the coordinate values of the geometric structure's centroid;

R is the radius from the geometric structure's centroid to an outermost vertex of the geometric structure (which together with ($X_c$, $Y_c$) defines the overall size of the employed geometric structure;

V(N, k) is the value $w*(1-w)**(k-1)$ where $w=1/(1+\text{sine}(\pi/N))$;

m[$L_k$] is the outer vertex number (1, 2, ..., N) assigned to the kth symbol appearing in the string (e.g. if A=1, B=2, and C=3 are assigned to the outer vertices of a triangle, as counted in a counter-clockwise order on the geometric structure, for the polynary string CABA, m[$L_1$] is set to 3, m[$L_2$] is set to 1, m[$L_3$] is set to 2, and m[$L_4$] is set to 1);

C(N, m[$L_k$])=cosine(a*$\pi$); and

S(N, m[$L_k$])=sine(a*$\pi$) [where a=(5*N−4*m[$L_k$])/(2*N)].

In one embodiment, a series of K values for V(N, k) are computed once and stored once N is specified. Similarly, the N values for C(N, m[$L_k$]) and the N values of S(N, m[$L_k$]) can also be computed once and stored. These pre-computations advantageously simplify the computations for the centroids of the various primitive elements of an employed recursively partitioned/nested geometric structure, as each location is principally the sum of products of fixed numbers that depend only on the m[$L_k$]'s of a given polynary string.

Continuing to refer to FIG. 9, next, graphing function 102 determines if the request is for multiple sets of data or functions, block 904. If so, graphing function 102 successively returns to block 902 to process the additional data sets or functions, and generate the display data associated with the corresponding recursively partitioned/nested geometric structure with visually differentiated structural parts for each of the requested graphing operations.

Eventually, having generated all the display data associated with the requested graph or graphs, graphing function 102 presents the generated geometric structure or geometric structures as requested. That is, if the request is for multiple graphs, and the format is for a side-by-side presentation, graphing function 102 scales the generated geometric structures, such that they may all be presented within a display window. The geometric structures may be scaled to a point such that all geometric structures are fitted with the display window, so they may all be viewed at the same time. Alternatively, the geometric structures may be scaled by a predetermined amount such that they may be viewed through scrolling in the appropriate directions. However, for the embodiment, the request may also specify that the geometric structures be rendered in multiple display pages and be viewed by the user "flipping" through the display pages (through any one of a number of user interaction techniques known in the art, e.g. page up, page down, and so forth).

Thereafter, i.e. after rendering the generated geometric structure or structures, graphing function 102 waits for user analysis commands, block 908. Various analysis commands may be supported. The extent of the support is application dependent. For the embodiment, included among the analysis commands supported is a zooming command. Moreover, in conjunction with the zoom command, a degree of zoom expressed in term of the most significant symbol value or values of the polynary strings may be specified. Thus, upon receipt of an analysis command, graphing function 102 determines if the inputted command is the zooming command, block 910. If the inputted command is a conventional user interaction command, such as scrolling left, scrolling right and so forth, the inputted command is handled in a conventional manner, block 914.

However, if the inputted command is the zoom command, graphing function 102 re-renders the presentation, rendering only the applicable sub-structures in accordance with the degree of zoom provided in conjunction with the zoom command, in an expanded manner, block 912. That is, the data are presented as if the data outside the scope of the specified zoom have been removed, and the remaining data within the scope of the zoom are encoded without the most significant symbol or symbols corresponding to the zooming specification.

For example, consider a collection of multi-variate data having data vectors represented by polynary strings of the form AAxxxx, ABxxxx, ACxxxx, BAxxxx, BBxxxx, BCxxxx, CAxxxx, CBxxxx, and CCxxxx (where x stands for any constituting symbol). For the embodiment, if a zooming command is received with the zooming specification of "A", the sub-structures or regions corresponding to the data vectors encoded in the form BAxxxx, BBxxxx, BCxxxx, CAxxxx, CBxxxx, and CCxxxx are excluded, whereas the sub-structures or regions corresponding to the remaining data vectors encoded in the form AAxxxx, ABxxxx, ACxxxx, are re-rendered in an expanded manner, considering only the residual lesser significant symbols of the polynary strings after the leading most significant symbol "A". Accordingly, the user is able to efficiently zoom into the "super" region "A", and analyze only the data vectors with the variable represented by the symbol "A" being the dominant contributing variable. Recall that the symbol corresponding to the variable having the highest initial relative coordinate values is selected first for inclusion in forming the polynary string. Thus, the symbol "A" occupying the first position of a polynary string denotes the variable represented by the symbol "A" has the highest initial relative coordinate value, and accordingly the most dominant variable.

In various embodiments, the zooming specification may be any sequence of the constituting symbols of the polynary strings of the data, of length less than K.

In various embodiments, the zoom command may also specify whether the zooming is to be applied locally to a particular geometric structure only, to a plurality of selected geometric structures, or to be applied globally to all requested presentations, thereby allowing isolated zooming on one of the rendered geometric structures or coordinated zooming on selected ones or all the rendered geometric structures. Further, zooming may be incrementally increased, e.g. by first specifying the most significant symbol value or values for the first zoom, then specifying the next most significant symbol value or values for the second zoom, and so forth.

In various embodiments, in conjunction with the zooming command, an "un-zoom" command is also supported. In response to each invocation of the "un-zoom" command, graphing function 102 reverses the last zooming operation performed. In yet other embodiments, in lieu of or in addition to a straight forward un-zoom, different granularity of zooming and un-zooming may be supported. For example, zooming may be advanced into a "super" region by two most significant symbol values, e.g. AB, and then un-zooming may be facilitated for just one symbol value "B". The resultant presentation would be the same as if the user has specified zooming by "A" in the first place.

Upon handling the inputted commands, except in the case of the exit or terminate command, graphing function 102 returns to block 908, and awaits input of the next analysis command. The process continues, until eventually an exit or terminate command is provided. At such time, graphing function 102 closes down its displays and terminates.

Figure 10:
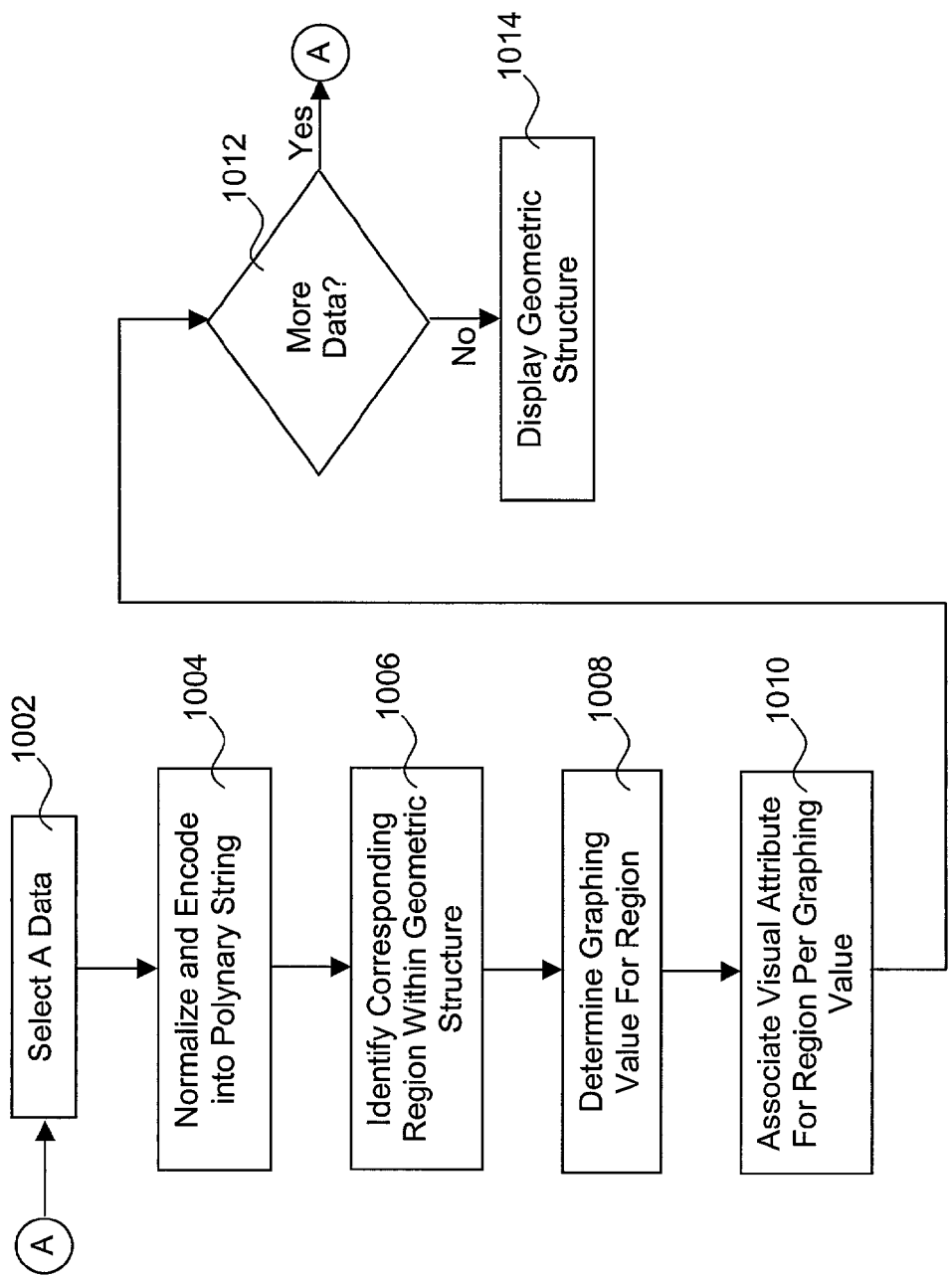
FIG. 10 illustrates the operational flow of the relevant aspects of the graphing function of FIG. 1 for presenting a collection of multi-variate data and facilitating their analysis, in accordance with one embodiment.
Figure 11:
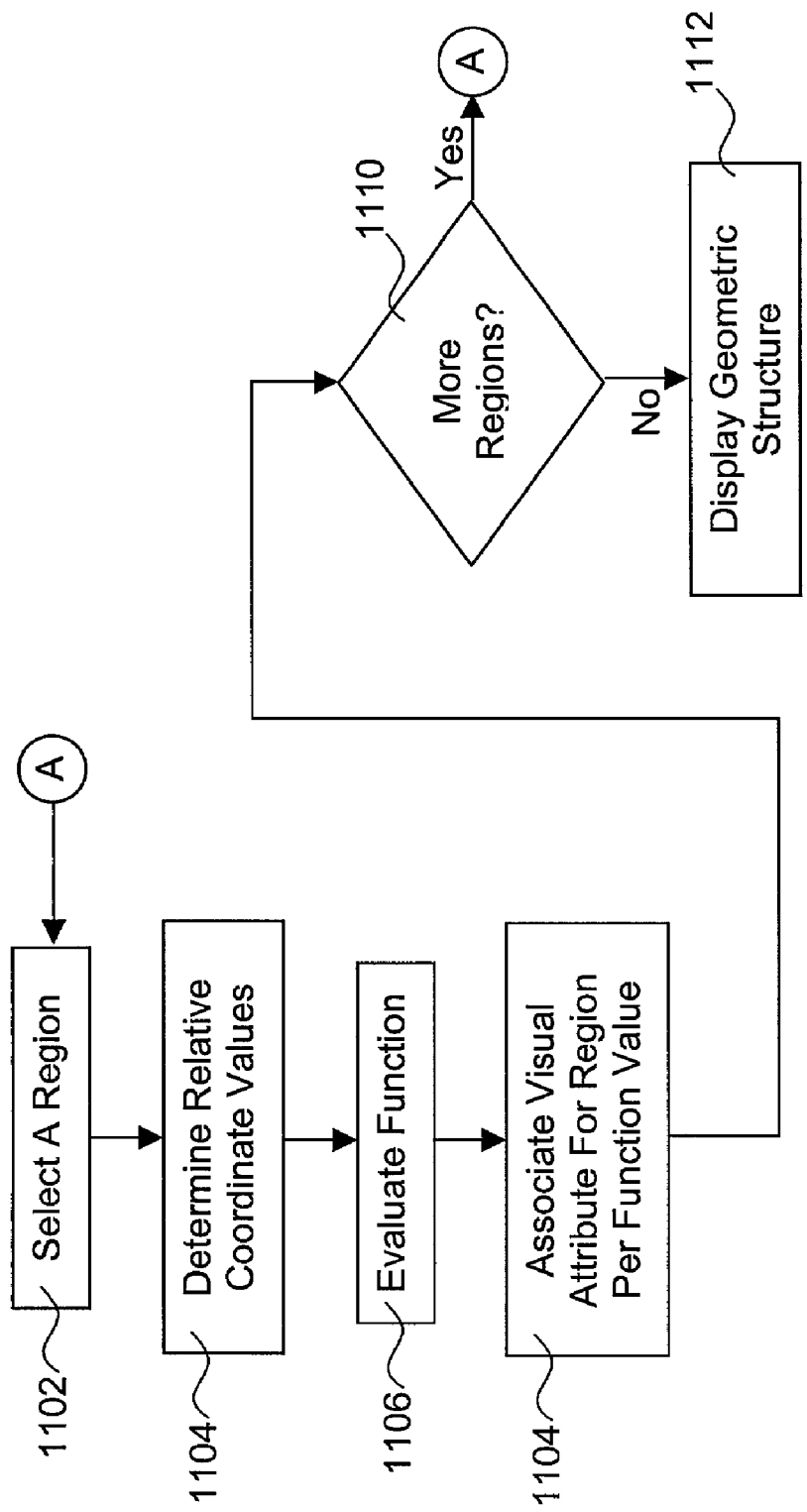
FIG. 11 illustrates the operational flow of the relevant aspects of the graphing function of FIG. 1 for presenting a multi-dimensional function, and facilitating its analysis, in accordance with one embodiment.

FIGS. 10–11 illustrate in further details, the operational flow of graphing function 102 for generating a recursively partitioned/nested geometric structure, in accordance with one embodiment each. More specifically, FIG. 10 illustrates the operational flow for presenting a set of multi-variate data, whereas FIG. 11 illustrates the operational flow for present a function of multi-dimensional variables.

As illustrated, for the embodiment, to present a set of multi-variate data, graphing function 102 first selects a data vector, normalized and encodes the data into a polynary string, block 1004, if necessary. Slack variables may be introduced to effectuate the normalization. Additionally, associated data required for intermediate calculations to generate the display data associated with the recursively partitioned/nested geometric structure may be stored in an associated working data set.

Then, graphing function 102 identifies the region within the recursively partitioned/nested geometric structure, to which the data vector corresponds, using the polynary string, block 1006. As can be seen, the process of identification, i.e. the corresponding region within the recursively partitioned/nested geometric structure to be employed, can be readily and easily accomplished through the polynary string.

Next, graphing function 102 determines a graphing value for the corresponding region, block 1008, and associates an appropriate visual attribute to the corresponding region based at least in part on the determined graphing value.

In one embodiment, if the requested presentation is for a set of multi-variate data, the graphing values are the frequencies of occurrences of the various polynary strings. Thus, in block 1008, the graphing value for the corresponding region is incremented accordingly. The graphing values, as alluded to earlier, may be maintained e.g. in an associated working data set. In another embodiment, if the requested presentation is for an output variable and a set of multi-variate input variables, the graphing value is simply the corresponding output value. In yet other embodiment, depending on the request, the graphing values may involve other processing of the multi-variate data, such as computing their averages and so forth. In like manner, these graphing values may be maintained e.g. in an associated working data set.

Any one of a number of visual attributes may be employed to differentiate the different graphing values. In one embodiment, different symbols, such as the "+" sign, the "−" sign, or other symbols, are employed to differentiate different ranges of the graphing values. In another embodiment, different colors are employed to differentiate different ranges of the graphing values. In yet other embodiments, other visual differentiators may be employed instead.

Upon so processing a data vector, graphing function 102 determines if all data vectors have been processed, block 1012. If additional data vectors remain to be processed, graphing function 102 returns to block 1002, and continues from there as earlier described. Eventually, there will no unprocessed data vector. At such time, graphing function 102 generates the recursively partitioned/nested geometric structure employing the visual attributes associated with appropriate ones of the regions, thereby differentiating the regions and allowing the multi-variate data to be pictorially conveyed to a user, block 1014.

To present a function, as illustrated in FIG. 11, graphing function 102 selects a region of the recursively partitioned/nested geometric structure, block 1102, determines the relative coordinates of the data vector based on a polynary string corresponding to the region, block 1104. Upon recovering the relative coordinates, graphing function 102 evaluates the function, using the recovered relative coordinates, block 1106. Then, graphing function 102 associates a visual attribute to the region, based on the computed output value for the function, block 1108. As before, the computed values may be maintained e.g. in a working data set, Graphing function 102 then determines if all regions have been processed, block 1110. If additional regions remain to be processed, graphing function 102 returns to block 1102, and continues from there as earlier described. Eventually, there will no unprocessed region. At such time, graphing function 102 generates the recursively partitioned/nested geometric structure employing the visual attributes associated with the regions, thereby differentiating the regions and allowing the function to be pictorially conveyed to a user, block 1112.

Example Processor Based Device

Figure 12:
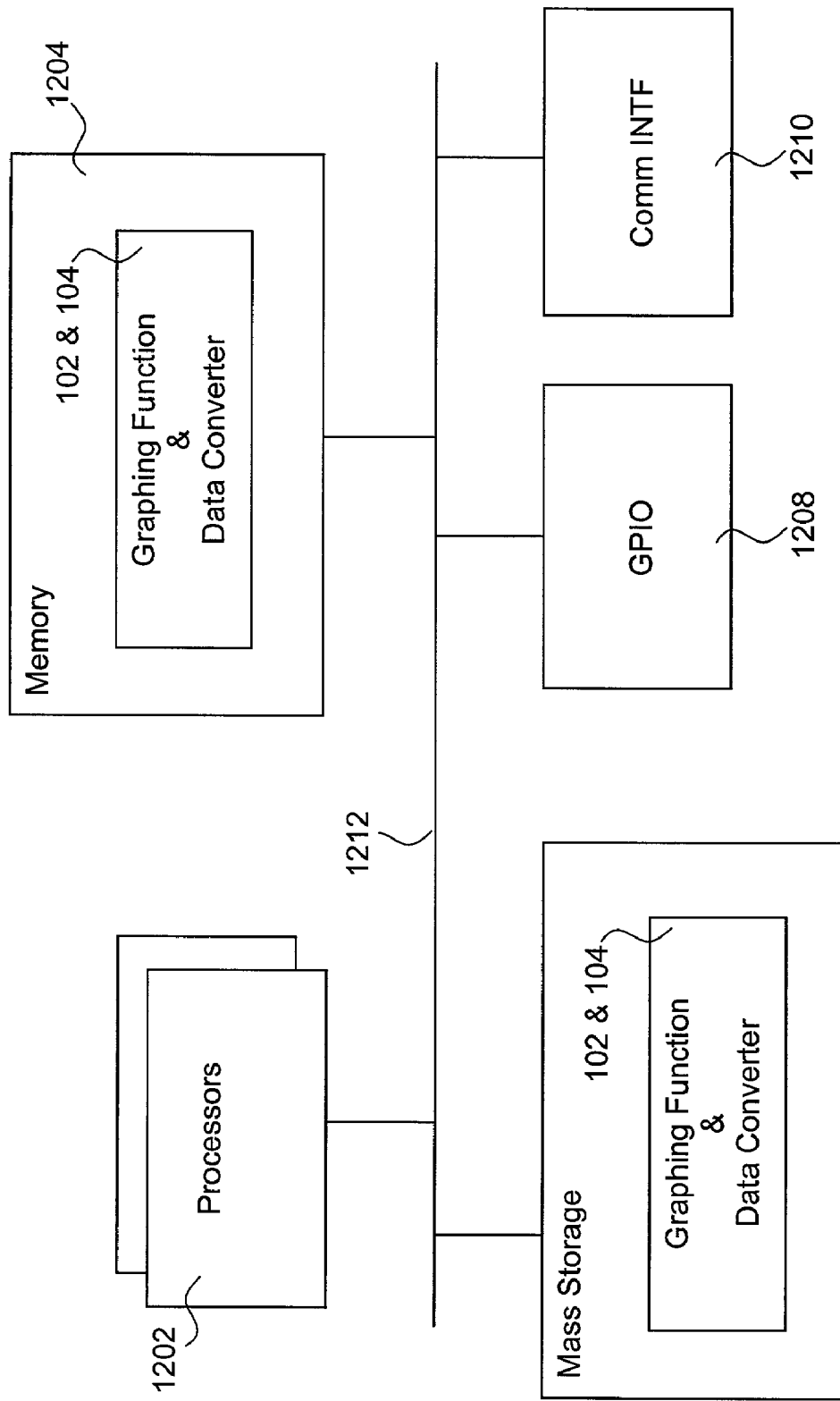
FIG. 12 illustrates an internal component view of a processor based system suitable for use to practice the present invention, in accordance with one embodiment.

FIG. 12 illustrates an example processor based device/system suitable for use to practice the present invention in accordance with one embodiment. As shown, example processor based device/system 1200 includes one or more processors 1202 and system memory 1204. Additionally, example device/system 1200 includes mass storage devices 1206 (such as diskette, hard drive, CDROM and so forth), input/output devices 1208 (such as keyboard, cursor control and so forth) and communication interfaces 1210 (such as network interface cards, modems and so forth). The elements are coupled to each other via system bus 1212, which represents one or more buses. In the case of multiple buses, they are bridged by one or more bus bridges (not shown). Each of these elements performs its conventional functions known in the art. In particular, system memory 1204 and mass storage 1206 are employed to store a working copy and a permanent copy of the programming instructions implementing the graphing function 102 and data format converter 104 incorporated with the teachings of the present invention. The permanent copy of the programming instructions may be loaded into mass storage 1206 in the factory, or in the field, through a distribution medium (not shown) or through communication interface 1210 (from a distribution server (not shown). The constitution of these elements 1202–1212 are known, and accordingly will not be further described.

In various embodiments, processor based device/system 1200 may be a wireless mobile phone, a palm sized personal digital assistant, a notebook computer, a set-top box, a desktop computer or a server. In alternate embodiments, the present invention may also be practiced on single processor systems, multi-processor systems or clusters of coupled systems, e.g. networked through private and/or public networks.

Advantages

Thus, it can be seen from the above description, presentation and analysis of multi-variate data, or functions of multi-dimensional variables are made easier and more comprehensible under the present invention. Further, the present invention is advantageously scalable to high dimensional data/variables.

Conclusion and Epilog

Thus, an improved method and apparatus for presenting and facilitating analysis of multi-variate data and/or functions of multi-dimensional variables has been described. While the present invention has been described in terms of the above illustrated embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A processor implemented data processing method comprising:
    identifying a first plurality of areas defined by a first corresponding plurality of geometric primitives disposed within a first innermost nested level of a first recursively partitioned/nested geometric structure having at least the first plurality of geometric primitives and a first other geometric primitive disposed in a first immediately preceding outer nesting level of the first innermost nested level, with the first plurality of areas defined by the first plurality of geometric primitives nested within a first other area defined by the first other geometric primitive, the first plurality of areas corresponding to a first plurality of normalized multi-dimensional data of a first normalized multi-dimensional data space, and the first recursively partitioned/nested geometric structure corresponding to the first normalized multi-dimensional data space;
    determining corresponding first graphing values for said first corresponding areas within said first recursively partitioned/nested geometric structure determined for said first normalized multi-dimensional data of said first normalized multi-dimensional data space;
    associating corresponding first visual attributes with said first corresponding areas within said first recursively partitioned/nested geometric structure, based at least in part on corresponding ones of said determined first graphing values; and
    displaying said first recursively partitioned/nested geometric structure, visually differentiating said first corresponding areas based at least in part on corresponding ones of said associated first visual attributes.

2. The method of claim 1, wherein each of said first normalized multi-dimensional data of said first normalized multi-dimensional data space comprises a plurality of relative coordinate values, and the method further comprises constructing a polynary string to represent each of said first normalized multi-dimensional data and its corresponding one of said first areas within said first recursively partitioned/nested geometric structure in accordance with the relative coordinate values.

3. The method of claim 2, wherein said constructing of a polynary string to represent each of said first normalized multi-dimensional data and its corresponding one of said first areas within said first recursively partitioned/nested geometric structure in accordance with the relative coordinate values comprises selecting a symbol as the next symbolic member of the polynary string based on which of the relative coordinate values is the current highest relative coordinate value.

4. The method of claim 3, wherein said constructing of a polynary string to represent each of said first normalized multi-dimensional data and its corresponding one of said first areas within said first recursively partitioned/nested geometric structure in accordance with the relative coordinate values further comprises reducing the highest relative coordinate value in by an amount (G), upon each selection, and reducing the amount (G) after each reduction.

5. The method of claim 4, wherein the amount (G) initially equals 1−F, and thereafter reduced each time by G*(1−F), where F equals (n−1)/n, and n equals the number of relative coordinate values.

6. The method of claim 2, wherein said determining of corresponding first graphic values comprises determining frequencies of occurrence of the various polynary strings of said first normalized multi-dimensional data, and assigning the determined frequencies of occurrence to the corresponding first areas within the first recursively partitioned/nested geometric structure as the determined first graphing values of the corresponding first areas.

7. The method of claim 2, wherein the method further comprises
    receiving a first zooming specification comprising one or more of said polynary string constituting symbols;
    excluding a first subset of said first areas based at least in part on said received first zooming specification; and
    repeating said displaying for the remaining ones of said first areas in an expanded manner.

8. The method of claim 7, wherein the method further comprises
    receiving a second zooming specification comprising one or more additional ones of said polynary string constituting symbols;
    excluding a second subset of said remaining ones of said first areas based at least in part on said received second zooming specification; and
    repeating said displaying for the remaining ones of said first areas.

9. The method of claim 8, wherein the method further comprises
    receiving an unzoom specification;
    restoring the remaining ones of said first areas to re-include said excluded second subset of said first areas; and
    repeating said displaying for the remaining ones of said first areas.

10. The method of claim 7, wherein the method further comprises
    receiving an unzoom specification;
    restoring the remaining ones of said first areas to re-include said excluded first subset of said first areas; and
    repeating said displaying for said first areas.

11. The method of claim 1, wherein said determining of corresponding first graphic values comprises assigning first output values corresponding to the first normalized multi-dimensional data as the determined first graphing values of the corresponding first areas within the first recursively partitioned/nested geometric structure.

12. The method of claim 11, wherein said determining of corresponding first graphic values further comprises computing said first output values.

13. The method of claim 12, wherein each of said first normalized multi-dimensional data of said first normalized multi-dimensional data space comprises a polynary string having a plurality of symbols, encoding a plurality of relative coordinate values, and said computing of the first output values comprises
for each constituting symbols of a polynary string, summing one or more appearance values corresponding to one or more appearances of the particular symbol in the polynary string, and adding the sum to an average residual relative coordinate value.

14. The method of claim 13, wherein each appearance value corresponding to an appearance of a particular symbol is dependent on the position of the particular appearance of the particular symbol in the polynary string.

15. The method of claim 14, wherein each appearance value corresponding to an appearance of a particular symbol is equal to a positional value associated with the position of the particular appearance in the polynary string.

16. The method of claim 15, wherein
each positional value equals to $(1-F) \times F^{**}(k-1)$, and
the average residual relative coordinate value equals $(1-F) \times F^{**}K$,
where F equals $(n-1)/n$,
k denotes a position in a polynary string,
n equals the number of relative coordinate values, and
K equals the length of the polynary string.

17. The method of claim 1, wherein said associating comprises for each of said first areas, associating a selected one of a plurality of symbols with the area based at least in part on the determined graphing value of the area.

18. The method of claim 1, wherein said associating comprises for each of said first areas, associating a selected one of a plurality of color attributes with the area based at least in part on the determined graphing value of the area.

19. The method of claim 1, wherein said associating comprises for each of said first areas, associating a selected blending of a plurality of colors with the area based at least in part on contributions to the determined graphing value of the area.

20. The method of claim 1, wherein said first areas correspond to all constituting areas of the first recursively partitioned/nested geometric structure, said first normalized multi-dimensional data are values of independent variables of a function, and said first graphing values are corresponding values of a dependent variable of the function.

21. The method of claim 1, wherein the method further comprises
identifying a second plurality of areas defined by a second plurality of geometric primitives disposed within a second innermost nested level of a second recursively partitioned/nested geometric structure having at least the second plurality of geometric primitives and a second other geometric primitive disposed in a second immediately preceding outer nesting level of the second innermost nested level, with the second plurality of areas defined by the second plurality of geometric primitives nested within a second other area defined by the second other geometric primitive, the second plurality of areas corresponding to a second plurality of normalized multi-dimensional data of a second normalized multi-dimensional data space, and the second recursively partitioned/nested geometric structure corresponding to the second normalized multi-dimensional data space;
determining corresponding second graphing values for said second corresponding areas within said second recursively partitioned/nested geometric structure determined for said second normalized multi-dimensional data of said second normalized multi-dimensional data space;
associating corresponding second visual attributes with said second corresponding areas within said second recursively partitioned/nested geometric structure, based at least in part on corresponding ones of said determined second graphing values; and
displaying said second recursively partitioned/nested geometric structure, visually differentiating said second corresponding areas based at least in part on corresponding ones of said associated second visual attributes.

22. The method of claim 21, wherein said first and second recursively partitioned/nested geometric structures are displayed in a manner such that both recursively partitioned/nested geometric structures are visible concurrently.

23. The method of claim 22, wherein each of said first and second normalized multi-dimensional data of said first and second normalized multi-dimensional data spaces comprises a polynary string having a plurality of symbols, encoding a plurality of relative coordinate values, the method further comprises
receiving a first zooming specification comprising one or more of said polynary string constituting symbols;
excluding a first subset of said first areas based at least in part on said received first zooming specification;
excluding a second subset of said second areas based at least part on the removed ones of said first areas; and
repeating said displaying for the remaining ones of said first and second areas.

24. The method of claim 21, wherein said first and second normalized multi-dimensional data are values of first and second input variables.

25. The method of claim 21, wherein said first normalized multi-dimensional data are values of input variables, and said second normalized multi-dimensional data are values of corresponding output variables.

26. The method of claim 1, wherein the method further comprises computing a location for a centroid for each of a plurality primitive elements of the geometric structure.

27. The method of claim 26, wherein coordinates $(x_p, y_p)$ of the location of each centroid is computed as follows:

$$Xp = Xc + R * \sum_{k=1}^{K} V(N,k) * C(N, m[Lk])$$

$$Yp = Yc + R * \sum_{k=1}^{K} V(N,k) * S(N, m[Lk])$$

where:
$(X_c, Y_c)$ are coordinate values of the geometric structure's centroid;
R is a radius extending from the geometric structure's centroid to an outermost vertex of the geometric structure;
$V(N, k)$ is $w*(1-w)^{**}(k-1)$ where $w=1/(1+\sine(\pi/N))$;

m[$L_k$] is outer vertex number (1, 2, ..., N) assigned to the kth symbol appearing in a corresponding polynary string;

C(N, m[$L_k$])=cosine(a*π); and

S(N, m[$L_k$])=sine(a*π) [where a=(5*N−4*m[$L_k$])/ (2*N)].

28. The method of claim 27, wherein the K values of V(N, k) are computed once responsive to a specification of N.

29. The method of claim 27, wherein at least the N values of C(N, m[$L_k$]) or the N values of S(N, m[$L_k$]) are computed once responsive to a specification of N.

30. The method of claim 1, wherein the method further comprises selecting the geometric primitives.

31. An apparatus comprising:

storage medium having stored therein programming instructions designed to enable the apparatus to identify a first plurality of areas defined by a first plurality of geometric primitives disposed within a first innermost nested level of a first recursively partitioned/nested geometric structure having the first plurality of geometric primitives and a first other geometric primitive disposed in a first immediately preceding outer nesting level of the first innermost nested level, with the first plurality of areas of the first plurality of geometric primitives nested within a first other area defined by the first other geometric primitive, the first plurality of areas corresponding to a first plurality of normalized multi-dimensional data of a first normalized multi-dimensional data space, and the first recursively partitioned/nested geometric structure being-corresponding to the first normalized multi-dimensional data space, determine corresponding first graphing values for said first corresponding areas within said first recursively partitioned/nested geometric structure determined for said first normalized multi-dimensional data of said first normalized multi-dimensional data space;

associate corresponding first visual attributes with said first corresponding areas within said first recursively partitioned/nested geometric structure, based at least in part on corresponding ones of said determined first graphing values, and display said first recursively partitioned/nested geometric structure, visually differentiating said first corresponding areas based at least in part on corresponding ones of said associated first visual attributes; and at least one processor coupled to the storage medium to execute the programming instructions.

32. The apparatus of claim 31, wherein each of said first normalized multi-dimensional data of said first normalized multi-dimensional data space comprises a plurality of relative coordinate values, and the programming instructions are further designed to enable the apparatus to construct a polynary string to represent each of said first normalized multi-dimensional data and its corresponding one of said first areas within said first recursively partitioned/nested geometric structure in accordance with the relative coordinate values.

33. The apparatus of claim 32, wherein said programming instructions are designed to enable the apparatus to perform said constructing of a polynary string by selecting a symbol as the next symbolic member of the polynary string based on which of the relative coordinate values is the current highest relative coordinate value.

34. The apparatus of claim 33, wherein said programming instructions are further designed to enable the apparatus to perform said constructing of a polynary string by reducing the highest relative coordinate value in by an amount (G), upon each selection, and reducing the amount (G) after each reduction.

35. The apparatus of claim 34, wherein said programming instructions are designed to enable the apparatus to set the amount (G) initially to 1−F, and thereafter reduced each time by G*(1−F), where F equals (n−1)/n, and n equals the number of relative coordinate values.

36. The apparatus of claim 32, wherein said programming instructions are designed to enable the apparatus to perform said determining by determining frequencies of occurrence of the various polynary strings of said first normalized multi-dimensional data, and assigning the determined frequencies of occurrence to the corresponding first areas within the first recursively partitioned/nested geometric structure as the determined first graphing values of the corresponding first areas.

37. The apparatus of claim 32, wherein said programming instructions are further designed to enable the apparatus to receive a first zooming specification comprising one or more of said polynary string constituting symbols;

exclude a first subset of said first areas based at least in part on said received first zooming specification; and repeat said displaying for the remaining ones of said first areas in an expanded manner.

38. The apparatus of claim 37, wherein said programming instructions are further designed to enable the apparatus to receive a second zooming specification comprising one or more additional ones of said polynary string constituting symbols;

exclude a second subset of said remaining ones of said first areas based at least in part on said received second zooming specification; and repeat said displaying for the remaining ones of said first areas.

39. The apparatus of claim 38, wherein said programming instructions are designed to enable the apparatus to receive an unzoom specification;

restore the remaining ones of said first areas to re-include said excluded second subset of said first areas; and repeat said displaying for the remaining ones of said first areas.

40. The apparatus of claim 37, wherein said programming instructions are further designed to enable the apparatus to receive an unzoom specification;

restore the remaining ones of said first areas to re-include said excluded first subset of said first areas; and repeat said displaying for said first areas.

41. The apparatus of claim 31, wherein said programming are designed to enable the apparatus to perform said determining by first output values corresponding to the first normalized multi-dimensional data as the determined first graphing values of the corresponding first areas within the first recursively partitioned/nested geometric structure.

42. The apparatus of claim 41, wherein said programming instructions are further designed to enable the apparatus to perform said determining by computing said first output values.

43. The apparatus of claim 42, wherein each of said first normalized multi-dimensional data of said first normalized multi-dimensional data space comprises a polynary string having a plurality of symbols, encoding a plurality of relative coordinate values, and said programming instructions are designed to enable the apparatus to perform said computing by summing one or more appearance values corresponding to one or more appearances of the particular symbol in a polynary string, and adding the sum to an average residual relative coordinate value, and repeating said summing and adding for each constituting symbols of the polynary string.

44. The apparatus of claim 43, wherein each appearance value corresponding to an appearance of a particular symbol is dependent on the position of the particular appearance of the particular symbol in the polynary string.

45. The apparatus of claim 44, wherein each appearance value corresponding to an appearance of a particular symbol is equal to a positional value associated with the position of the particular appearance in the polynary string.

46. The apparatus of claim 45, wherein each positional value equals to $(1-F) \times F^{}(k-1)$, and the average residual relative coordinate value equals $(1-F) \times F^{}K$, where F equals $(n-1)/n$, k denotes a position in a polynary string, n equals the number of relative coordinate values, and K equals the length of the polynary string.

47. The apparatus of claim 31, wherein said programming instructions are designed to enable the apparatus to perform said associating by associating, for each of said first areas, a selected one of a plurality of symbols with the area based at least in part on the determined graphing value of the area.

48. The apparatus of claim 31, wherein said programming instructions are designed to enable the apparatus to perform said associating by associating, for each of said first areas, a selected one of a plurality of color attributes with the area based at least in part on the determined graphing value of the area.

49. The apparatus of claim 31, wherein said programming instructions are designed to enable the apparatus to perform said associating by associating, for each of said first areas, a selected blending of a plurality of colors with the area based at least in part on contributions to the determined graphing value of the area.

50. The apparatus of claim 31, wherein said first areas correspond to all constituting areas of the first recursively partitioned/nested geometric structure, said first normalized multi-dimensional data are values of independent variables of a function, and said first graphing values are corresponding values of a dependent variable of the function.

51. The apparatus of claim 31, wherein said programming instructions are further designed to enable the apparatus to identify a second plurality of areas defined by a second plurality of geometric primitives disposed within a second innermost nested level of a second recursively partitioned/nested geometric structure having at least the second plurality of geometric primitives and a second other geometric primitive disposed in a second immediately preceding outer nesting level of the second innermost nested level, with the second plurality of areas defined by the second plurality of geometric primitives nested within a second other area defined by the second other geometric primitive, the second plurality of areas corresponding to a second plurality of normalized multi-dimensional data of a second normalized multi-dimensional data space, and the second recursively partitioned/nested geometric structure corresponding to the second normalized multi-dimensional data space;

determine corresponding second graphing values for said second corresponding areas within said second recursively partitioned/nested geometric structure determined for said second normalized multi-dimensional data of said second normalized multi-dimensional data space;

associate corresponding second visual attributes with said second corresponding areas within said second recursively partitioned/nested geometric structure, based at least in part on corresponding ones of said determined second graphing values; and display said second recursively partitioned/nested geometric structure, visually differentiating said second corresponding areas based at least in part on corresponding ones of said associated second visual attributes.

52. The apparatus of claim 51, wherein said first and second partitioned/nested geometric structures are displayed in a manner such both recursively partitioned/nested geometric structures are visible concurrently.

53. The apparatus of claim 52, wherein each of said first and second normalized multi-dimensional data of said first and second normalized multi-dimensional data spaces comprises a polynary string having a plurality of symbols, encoding a plurality of relative coordinate values, said programming instructions are further designed to enable the apparatus to receive a first zooming specification comprising one or more of said polynary string constituting symbols;

exclude a first subset of said first areas based at least in part on said received first zooming specification;

exclude a second subset of said second areas based at least part on the removed ones of said first areas; and repeat said displaying for the remaining ones of said first and second areas.

54. The apparatus of claim 51, wherein said first and second normalized multi-dimensional data are values of first and second input variables.

55. The apparatus of claim 51, wherein said first normalized multi-dimensional data are values of input variables, and said second normalized multi-dimensional data are values of corresponding output variables.

56. The apparatus of claim 31, wherein said apparatus is a selected one of a palm sized processor based device, a notebook computer, a desktop computer, a set-top box, a single processor server, a multi-processor server, and a collection of coupled servers.

57. The apparatus of claim 31, wherein said programming instructions are further designed to compute a location for a centroid for each of a plurality of primitive elements of the geometric structure.

58. The apparatus of claim 57, wherein said programming instructions are designed to compute coordinates $(x_p, y_p)$ of the location of each centroid as follows:

$$Xp = Xc + R * \sum_{k=1}^{K} V(N,k) * C(N, m[Lk])$$

$$Yp = Yc + R * \sum_{k=1}^{K} V(N,k) * S(N, m[Lk])$$

where:

$(X_c, Y_c)$ are coordinate values of the geometric structure's centroid;

R is a radius extending from the geometric structure's centroid to an outermost vertex of the geometric structure;

V(N, k) is $w*(1-w)**(k-1)$ where $w=1/(1+\text{sine}(\pi/N))$;

$m[L_k]$ is outer vertex number (1, 2, ..., N) assigned to the kth symbol appearing in a corresponding polynary string;

$C(N, m[L_k])=\text{cosine}(a*\pi)$; and $S(N, m[L_k])=\text{sine}(a*\pi)$ [where $a=(5*N-4*m[L_k])/(2*N)$].

59. The apparatus of claim 58, wherein said programming instructions are designed to compute the K values of V(N, k) once responsive to a specification of N.

60. The method of claim 58, wherein said programming instructions are designed to compute at least the N values of $C(N, m[L_k])$ or the N values of $S(N, m[L_k])$ once responsive to a specification of N.

61. The apparatus of claim 31, wherein the programming instructions are further designed to enable the apparatus to select the geometric primitives.

* * * * *